(No Model.)

D. B. DETWEILER.
HARVESTER CUTTER BAR.

No. 365,588. Patented June 28, 1887.

WITNESSES:
Chas. Nida
C. Sedgwick

INVENTOR:
D. B. Detweiler
BY Munn & Co
ATTORNEYS.

UNITED STATES PATENT OFFICE.

DANIEL B. DETWEILER, OF BERLIN, ONTARIO, CANADA.

HARVESTER CUTTER-BAR.

SPECIFICATION forming part of Letters Patent No. 365,588, dated June 28, 1887.

Application filed October 21, 1886. Serial No. 216,807. (No model.)

*To all whom it may concern:*

Be it known that I, DANIEL B. DETWEILER, of Berlin, in the Province of Ontario and Dominion of Canada, have invented a new and Improved Harvester Cutter-Bar, of which the following is a full, clear, and exact description.

The object of my invention is to so mount the ledger-plates of a cutting apparatus that they may all be removed at once and without the necessity of removing the guard-fingers or loosening any of their connections or fastenings on the finger-bar whereto the guard-fingers are secured. These objects I accomplish by the construction illustrated in the accompanying drawings, and to be hereinafter described, and specifically pointed out in the claims.

Reference is to be had to the accompanying drawings, forming a part of this specification, in which similar figures of reference indicate corresponding parts in all the views.

Figure 1:
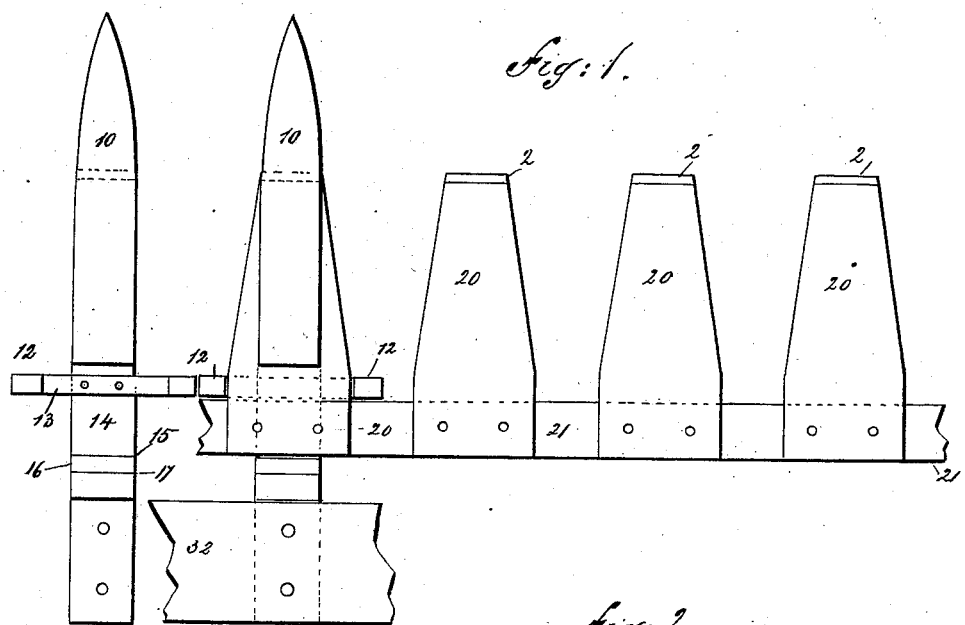
Figure 2:
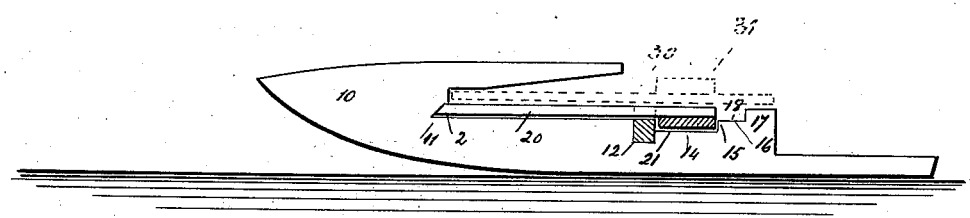
Figure 3:
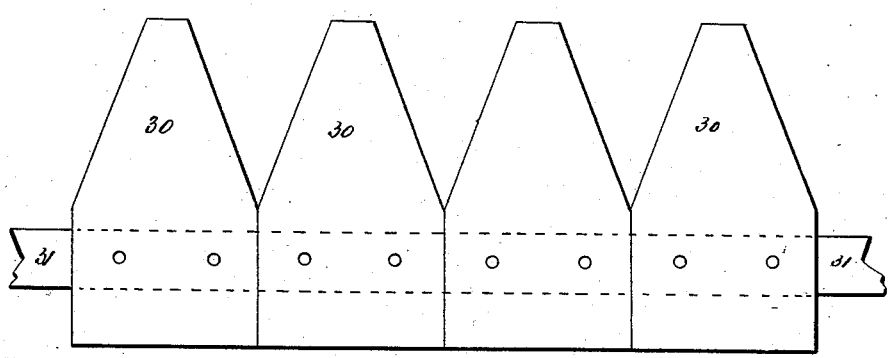
Figure 4:
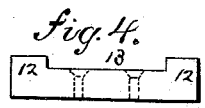

Figure 1 is a plan view of a portion of a cutter-bar provided with my improved form of removable ledger-plates. Fig. 2 is a cross-sectional view representing one of the ledger-plates as in position within its finger. Fig. 3 is an inverted plan view of the form of knife-bar which I prefer to use in connection with the ledger-plates illustrated in Fig. 1. Fig. 4 is a side elevation of one of the recessed cross-strips.

In the drawings, 10 represents the fingers of a finger-bar, which are, as usual, formed with horizontal slots, within which the knives are reciprocated above the ledger-plates; but in the construction illustrated the fingers 10 are formed with beveled recesses 11 and are provided with cross-strips 12, that are formed with recesses 13, the said strips being secured to the fingers by screws. Back of the cross-bar 12 there is in each guard-finger a recess, 14, that is defined upon the rear by a shoulder, 15, above and to the rear of which there is a ledge, 16, which, with a shoulder, 17, forms a recess, 18, which latter recess facilitates the insertion and withdrawal of the ledger-plates.

The ledger-plates, to the peculiar arrangement of which this invention more particularly relates, are shown at 20, and each plate is secured, preferably, by riveting it to a bar, 21, there being a space between each plate, the plates 20 being so spaced that they will fit within the fingers 10, the forward ends of the plates being beveled off, as shown at 2, in order that the said ends may fit within the beveled recesses 11. The cross-bars 12 serve to steady and stiffen the plates, said plates resting within the recesses 13, formed in said bars 12, while the bar 21, to which all of the ledger-plates are secured, rests within the recesses 14, the rear edge of the bar abutting against the shoulders 15.

The knife-blades 30 are secured, as shown, to a bar, 31; but although most any form of knife-bar could be used in connection with the construction above referred to, I prefer to employ a knife-bar wherein the apex of the angle formed by the meeting of the cutting-edges of the knives is some distance in advance of the forward edge of the bar, this construction providing for the proper grinding or sharpening of the knives.

It will of course be understood that the fingers 10 are, as usual, rigidly connected to and supported by a finger-bar, such as the one partially shown at 32 in Fig. 1. Any of the well-known devices may be employed for the purpose of holding the knife-bar down upon the finger-bar.

When it is desired to remove the ledger-plates in order that they may be sharpened, the bar 21 is slightly raised and drawn back, so that it rests upon the ledge 16, and the rear edge of the bar abutting at this time against the shoulder 17, after which movement the bar 21, and with it all of the ledger-plates, may be withdrawn.

It will be noticed that the ledger-plates are only slightly wider at the base than at the point, this construction being adopted in order that a straighter cutting-edge may be presented to the knives, and in order that the knives may not have to travel over so much surface when they are reciprocated.

Having thus fully described my invention, I claim as new and desire to secure by Letters Patent—

1. In a harvester-cutter mechanism, the combination, with the fingers, each provided with two recesses on its upper surface, the cross-strips resting in the forward one of the recesses in the fingers and each having a recess to receive the ledger-plates, of ledger-plates resting in these recesses and secured to a bar, 21, resting in the rear one of the recesses of the said fingers, substantially as herein shown and described.

2. In a harvester-cutter mechanism, the combination, with fingers formed with recesses 11 and 14, and provided with cross-bars formed with recesses 13, of a bar, 21, carrying ledger-plates 20, formed with beveled points 2, arranged to fit within the recesses 11 of the fingers, while the main bodies of the plates are arranged to rest within the recesses 13 of the cross-bars 12, substantially as described.

DANIEL B. DETWEILER.

Witnesses:
W. H. BOWMAN,
SIMON P. BOWMAN.